United States Patent
Salembier

Patent Number: 6,157,745
Date of Patent: *Dec. 5, 2000

[54] METHOD AND SYSTEM FOR CODING AND DECODING A SEQUENCE OF SEGMENTED IMAGES

[75] Inventor: Philippe Salembier, Esplugas-Barcelona, Spain

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/709,498

[22] Filed: Sep. 6, 1996

[30] Foreign Application Priority Data

Sep. 6, 1995 [EP] European Pat. Off. .............. 95402020

[51] Int. Cl.$^7$ ...................................... G06K 9/36
[52] U.S. Cl. ............................ 382/236; 382/238; 348/413
[58] Field of Search ..................................... 382/236, 238, 382/199; 348/413, 397, 399, 416, 699

[56] References Cited

U.S. PATENT DOCUMENTS 4,951,140  8/1990  Ueno et al. .............................. 348/413

FOREIGN PATENT DOCUMENTS

| 0587232A1 | 3/1994 | European Pat. Off. . |
| 0592029A1 | 4/1994 | European Pat. Off. . |
| 954018131 | 8/1995 | European Pat. Off. . |

OTHER PUBLICATIONS

"Shape and Location Coding for Contour Images" Picture Coding Symposium, Lausanne (Switzerland) Mar. 1993, pp. 18.6.1–18.6.2.

Chuang Gu et al., "Contour Simplification and Motion Compensated Coding", Nov. 1995, pp. 279–296.

"A High–Compression Image Coding Method Based on a New Segmentation Technique", L .H. Chen and Y. K. Chen, Proceedings of the National Science Council, Republic of China, Part: Physical Science and Engineering, vol. 16, No. 5, Sep. 1992, pp.403–421.

"Motion and Region Overlapping Estimation for Segmentation–Based Video Coding" of M. Pardas and P. Salembier, IEEE International Conference on Image Processing, Austin, Texas (USA), Nov. 1994, vol. 11, pp. 428–432.

"Time Recursive Segmentation of Image Seq;uences" of M. Pardas and P. Salembier, Eusipco 94, VIIth European Signal Processing Conference, Edinburgh, U.K., Sep. 13, 1994.

"Region Based Motion Analysis for Cideo Coding at alow Bitrates", H. Sanson, Proceedings of MPEG4 Seminar, Paris (France), Mar. 1994.

Spiral Image Compression by an Unrestricted Chain Coding Method, P.N. Nichol and R. J. Miller, 5th International Conference on Image Processing and its Applications, UK, Jul. 4–6, 1995, pp. 564–568.

*Primary Examiner*—Jose L. Couso
*Assistant Examiner*—Anh Hong Do
*Attorney, Agent, or Firm*—Laurie E. Gathman

[57] ABSTRACT

The invention relates to an image sequence coding method comprising, after a segmentation of the images into partitions with associated labels, the main steps of coding the contours of the regions sent in intra-frame mode, generating a compensated partition, and computing from said compensated partition and the current one an error partition that is then coded. While reducing the computational load, this method, that allows to transmit information about a time-varying partition with the help of the motion of the pixels, is preferably carried out by means of an encoding sub-assembly comprising an intra coding device (181), a compensating device (182), and an inter coding device (183) extracting and coding partition errors defined by an extraction of error regions where compensated and current labels are different.

10 Claims, 10 Drawing Sheets

METHOD AND SYSTEM FOR CODING AND DECODING A SEQUENCE OF SEGMENTED IMAGES

BACKGROUND OF THE INVENTION

The present invention relates to a method of coding a sequence of segmented images comprising a plurality of regions and associated labels and defining successive partitions, said method comprising the operations of estimating a motion model that characterizes for each of said regions the evolution of the segmentation from a previous partition to the current one and encoding the contour and the texture of each region of said current partition.

The invention also relates to a system for coding a sequence of segmented images comprising a plurality of regions and associated labels and defining successive partitions, said system comprising means for estimating a motion model that characterizes for each of said regions the evolution of the segmentation from a previous partition to the current one and means for encoding the contour and the texture of each region of said current partition, and to a coded signal as obtained at the output of such a system and to a storage medium for storing said coded signal.

The invention also relates to a method of decoding coded signals corresponding to the regions of each successive partition of a sequence of segmented images, and to a decoding system for carrying out said decoding method.

In the following description, the word "image" has to be understood according to its widest meaning. It is indeed clear that the invention deals not only with conventional images in which at least a luminance signal is associated to each picture element (or pixel), but also more generally to any set of tridimensional data (u, v, w) among which two of them define a kind of position within a predetermined frame and the third one a value varying within a given range and respectively associated to each pair of data. The proposed method offers however a substantial interest for all segmentation-based coding techniques and can be used particularly in video terminals that use a motion compensated coding of the partition issued from the segmentation. Such techniques are mainly useful for very low bit rate applications, and a standardization under the reference MPEG4 is contemplated (MPEG is an acronym for "Moving Picture Experts Group", which is a group of experts of the International Standardization Organization ISO).

The document "A high-compression image coding method based on a new segmentation technique", L. H. Chen and Y. K. Chen, Proceedings of the National Science Council, Republic of China, Part A: Physical Science and Engineering, vol. 16, n°5, September 1992, pp.403–421, relates to a segmentation based coding technique describing how to represent the regions obtained after having partitioned an input video sequence into regions. The described coding method includes a contour coding used to describe the contour points of each region and a texture coding used to estimate the value of each pixel in each region of the partition. A particular problem with such a technique is to maintain at a low level the computational load and the cost of transmission when the information to encode and transmit includes motion information both about the partition and the pixels inside each region of said partition.

SUMMARY OF THE INVENTION

It is a first object of the invention to propose a partition coding method leading to a reduced amount of transmitted information and therefore to a lower (and consequently less expensive) computational load.

To this end the invention relates to a method as defined in the preamble of the description and in which said encoding operation comprises in cascade the steps of:
  coding the contours of the regions to be transmitted and/or stored according to an intra-frame mode;
  generating a compensated partition involving both said regions to be sent in intra-frame mode and regions compensated on the basis of said motion model;
  computing from said current and compensated partitions an error partition and coding both said error partition and the label of each region of the coded error partition.

With such a coding method, the only motion information to be sent and transmitted is indeed the texture motion and the region order, that represents a small additional amount of information, the labels of each region being efficiently coded by using the information of the compensated partition. Moreover, while the coding of the compensation error is done globally on a frame basis and not on a region basis, the coding strategy however defines a transmission mode (intra-frame or inter-frame mode) for each region individually, without considering that all the regions are to be processed by the same mode. As a consequence, this method leads to a reduced amount of information to be sent and a better quality of the obtained images.

According to the invention, this method may preferably be realized in the following manner:
  (A) said coding step comprises the sub-steps of:
    selecting the set of regions of said current partition that have to be transmitted and/or stored in intra-frame mode;
    coding said selected regions;
    creating a mask associating these selected regions and coding it;
  (B) said generating step comprises the sub-steps of:
    for each concerned region, assigning to all points of the current partition the motion model estimated for said concerned region;
    generating said compensated partition on the basis of a comparison, for each concerned region, between the current partition and a partition reconstructed while considering said assigned motion model;
  (C) said computing and coding step comprises the sub-steps of:
    computing an error partition from said current and compensated partitions;
    coding the contours of a so-called over-partition associating the contours of said compensated partition and the contours of said error regions;
    coding the labels of each region of said coded over-partition.

In an improved implementation of this last realization, said generating step may comprise, in cascade between its two first sub-steps and the input of said computing and coding step, the sub-steps of:
  selecting one connected component for each label, according to a first predetermined criterion;
  eliminating the holes corresponding to the connected components not selected, according to a second predetermined criterion.

Either with this improved implementation or with the previous one, an additional simplifying sub-step may be provided between said computing and contour coding sub-steps of the computing and coding step, in order either to discard or to preserve and code each region of the error partition.

It is another object of the invention to propose a system for implementing a coding method as previously presented.

To this end the invention relates to a system as defined in the preamble of the description and in which said encoding means comprise:

an intra coding device, for generating the coded contour information of the regions to be transmitted and/or stored according to an intra-frame mode;

a compensating device, for computing a compensated partition that includes said regions sent in intra-frame mode and regions compensated on the basis of said estimated motion model;

an inter coding device, for extracting and coding partition errors, such partition errors being defined by an extraction of error regions where compensated and current labels are different.

A further object of the invention is to define a coded signal such as generated by such a coding system, said coded signal consisting of a multiplexed signal comprising:

(A) a motion information, corresponding to the estimation of a motion model that characterizes the evolution of the segmentation between said successive partitions;

(B) a first coded contour information, corresponding to each region of the current partition that has to be transmitted and/or stored in an intra-frame mode;

(C) a second coded contour information, corresponding to each region of a current error partition, said partition associating error regions where current labels are different from the labels observed in a compensated partition associating regions compensated on the basis of said estimated motion model;

(D) a coded label information, comprising a label for each region transmitted and/or stored in intra-frame mode and a label for each error region.

A further object of the invention is to propose a storage medium for storing said coded signal.

A further object of the invention is finally to propose a method of decoding such a coded signal, said decoding method then comprising the steps of:

(a) decoding the contours of the regions that have been previously coded in intra-frame mode and creating a corresponding mask by assigning the corresponding labels to these regions and a zero label to the other ones;

(b) generating a compensated partition made of intra-frame coded regions, motion compensated regions and holes corresponding to empty areas, then decoding the error regions and generating a so-called over-partition associating the contours of said compensated regions and the contours of said error regions;

(c) decoding and assigning the labels of the regions of said over-partition; and to propose a corresponding decoding system, then comprising in cascade an intra region decoding circuit, provided for decoding the regions that have been sent in intra-frame mode, a compensating circuit, provided for generating a compensated partition made of intra-frame coded regions, motion compensated regions and holes corresponding to empty areas, and a region decoding circuit including an error region decoding stage, provided for generating a so-called over-partition associating the contours of said compensated regions and the contours of said error regions, and a label decoding sub-stage, provided for decoding and assigning the labels of the regions of said over-partition.

BRIEF DESCRIPTION OF THE DRAWING

These and other aspects of the invention will be apparent from and elucidated with reference to the embodiments described hereinafter.

DETAILED DESCRIPTION OF THE PREFERRED EMBODIMENTS

In the following description, a method will be described for coding the information related to a time varying partition, with the help of an information about the motion of the pixel values and also with the help of an additional order information concerning the neighboring regions of the partition. This additional information should be for instance the order relation defined and described in the communication "Motion and region overlapping estimation for segmentation-based video coding" of M. Pardàs and P. Salembier, IEEE International Conference on Image Processing, Austin, Tex. (USA), November 1994, vol.II, pp.428–432. Although said coding method should be used for example with such an order relation definition method, it is more particularly adapted to be implemented in relation with the improved type of ordering described in the previous european patent application n°95401813.1 filed by the applicant on Aug. 2, 1995.

This previous european patent application will be recalled hereinafter, while using the following notations:

the original frames at times (T−1), T, . . . , are called ORIG(−1), ORIG(0), . . . , and so on;

the partitions are similarly called SEG(0) for the current partition at time T, SEG(−1) for the previous partition at time (T−1), and so on if necessary for other partitions at other times (an implementation of a segmentation method is for instance described in the communication "Time-Recursive Segmentation of Image Sequences" of M. Pardàs and P. Salembier, EUSIPCO 94, VIIth European Signal Processing Conference, Edinburgh, United Kingdom, Sep. 13, 1994);

similarly REC(0) and REC(−1) designate the current (at time T) and previous (at time (T−1)) partitions as they would be reconstructed at the receiver side after transmission, and as they are obtained at the encoding side;

MOT(0) is the motion information that characterizes the evolution of the partition between (T−1) and T (that is to say that allows to deduce SEG(0) from SEG(−1)), and is generally represented by a set of parameters that are assigned to each region of the previous partition SEG(−1) (for the purpose of motion estimation a method as described in the document "Region-based motion analysis for video coding at low bitrates", H. Sanson, Proceedings of MPEG4 Seminar, Paris (France), March 1994, can be proposed).

Figure 1:
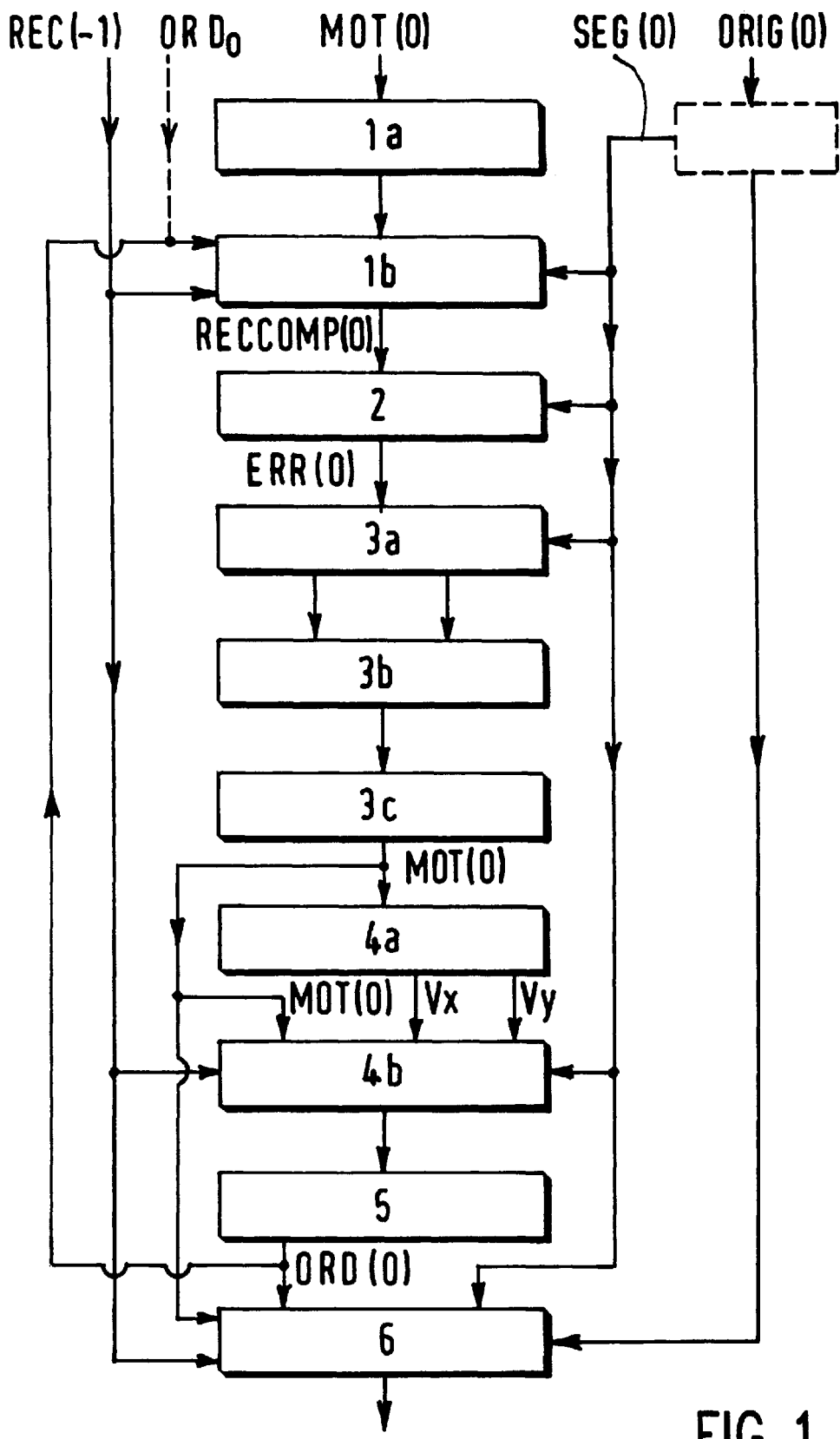
FIG. 1 is an illustration of a previous coding method that may be incorporated to the method according to the invention, with FIGS. 2 to 13 also relating to said previous method.

The coding method described in said previous european patent application is schematically shown in FIG. 1. Said method comprises in cascade the following first and second steps: definition of the transmission mode of each region (from 1a to 3c), order computation (from 4a to 5). For the first step of definition of the transmission mode, the input data are the current segmented partition SEG(0) (obtained from the corresponding original image ORIG(0)), the previous reconstructed partition REC(−1), and the motion information MOT(0) associated to the partition SEG(−1). The objective of this first step is to define the transmission mode (intra-frame mode or inter-frame mode) of each region, by sending a binary information used to say to the receiver whether or not the region is transmitted in intra-frame mode for contour coding and stored for instance within the motion information MOT(0). This motion information MOT(0) will therefore involve a set of motion parameters for each region (as already said) plus a binary information indicating the transmission mode of the associated contours. The decision about this transmission mode is taken on the basis of the cost of the contour, by comparing the cost of each region according to the fact that it is sent in intra-frame mode or in inter-frame mode. As shown in FIG. 1, three sub-steps are considered in this first step.

Figure 2:
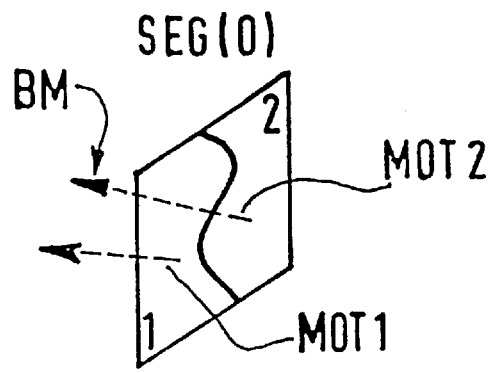
FIG. 2 illustrates, in view of a motion estimation of the regions of the current partition, the vectors that, for each represented region, describe the time evolution of the region in a backward mode.
Figure 3:
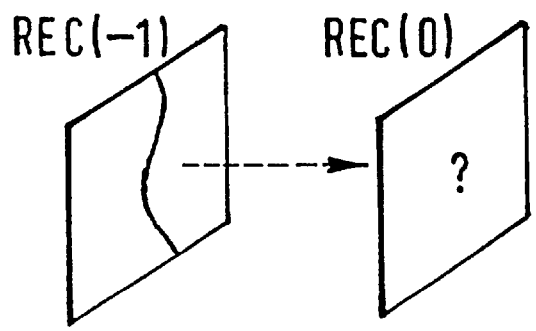
FIG. 3 illustrates the partition compensation provided for defining a prediction of the current partition.

The first sub-step (1a, 1b) is provided for compensating the whole partition. Based on the previous reconstructed partition REC(−1), the motion information MOT(0) and the order information, called ORD(0), this partition compensation, comprising two operations (1a) and (1b), will lead to a compensated partition called RECCOMP(0). Although these two operations are described later in a more detailed manner, the general philosophy of this partition compensation may be recalled in relation with FIGS. 2 and 3. Before the compensation, the motion of the various regions of the current partition SEG(0) are estimated. The obtained motion estimation gives a set of parameters describing the time evolution of each region in a backward mode BM. In FIG. 2, only one vector (MOT1 and MOT2) has been represented for each region of SEG(0), but the estimation generally gives more complex models defining one motion vector for each pixel of each region. Having noted that the motion of the pixels inside a region (texture motion) and the motion of the shape of a region may not be equivalent (both motions coincide in the case of foreground regions, for which the pixels of interior and contours follow the same motion, but it is not the case for a background region because the modifications of its shape or of its contours are defined by the motion of the regions in its foreground), it is assumed that the texture motion is used to compensate both the partition and the texture. The partition compensation problem is then shown in FIG. 3: based on the previously reconstructed partition REC(−1) and on the transmitted motion parameters, the compensation should define a prediction of the current partition REC(0).

Figure 4:
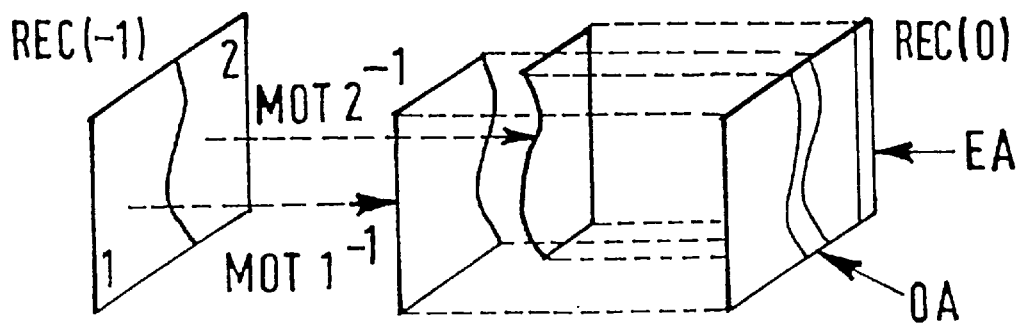
FIG. 4 illustrates a forward motion compensation of partition.

The compensation itself can work either in a forward mode or in a backward mode. As shown in FIG. 4, in the forward mode, the pixels of REC(−1) are projected towards REC(0). This projection can be done if the motion vectors MOT1 and MOT2, as defined by the estimation done in a backward mode, are inverted (MOT1$^{-1}$ and MOT2$^{-1}$). As can be seen, two problems may result from the transformation of the regions. Some pixels of REC(0) may have no label, they constitute the so-called empty areas (only one, called EA, in FIG. 4). By contrast, some pixels may have several label candidates, these conflicting areas are called overlapping areas (only one, called OA, in FIG. 4). To solve the conflicts, the order information is used to decide which region is considered to be in the foreground of which region (in case of conflicts between labels, the foreground region gives the correct label). The problem of overlapping areas is specially important if the texture motion is used to compensate the partition because of the issue of foreground/background relationship between regions commented above. However, the use of the texture motion and of the order is a quite efficient solution because the texture motion information leads to a good compensation of the texture and the order only represents a small amount of information. Finally, the empty areas are left without label and are processed as compensation errors.

Figure 5:
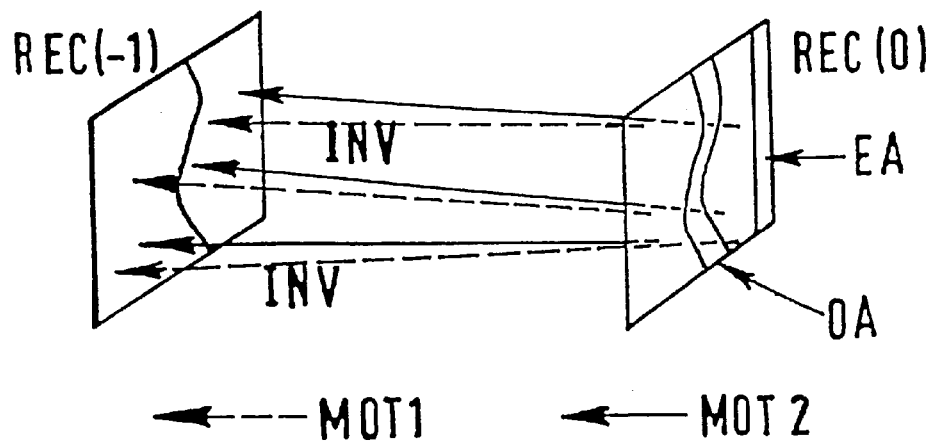
FIG. 5 a backward motion compensation of partition.

The dual mode of compensation is illustrated in FIG. 5. It is a backward mode in the sense that, for each pixel of REC(0), one tries to look on REC(−1), which label has to be selected. In this case, the main problem is to define which motion vector has to be used when a pixel (i,j) of REC(0) is considered. Indeed, since the current partition is not yet known at the receiver side, one does not know the region the pixel belongs to and therefore its corresponding motion model. The solution consists in considering all possible vectors defined by all possible regions. In the case of FIG. 5, there are two regions, and two vectors are therefore considered for each point: one given by region 1 (MOT1) and one given by region 2 (MOT2). Each time a vector as defined by a region n does not point to a pixel belonging to region n in REC(−1), the compensation is considered as being invalid and the corresponding vector (INV) is discarded (in FIG. 5, this is the case for two vectors). However, as in the case of forward motion compensation, some pixels have no valid compensation (empty area EA) and some others have more than one candidate (overlapping area OA). As previously, the order information is used to solve the conflicting areas.

The main difference between the forward and backward modes of compensation deals with the quantization of the pixel locations. Indeed, generally, the motion vectors start from an integer pixel location but point to a non-integer location. In the forward case, it is the locations of pixels of REC(0) that have to be quantized whereas in the backward case, the locations of pixels of REC(-1) have to be quantized. There are some more difficulties related to the forward mode in the case of motion models involving modifications of the scale (zoom in particular). Indeed, in the case of region expansion, the modification of the distance between two pixels may create more empty areas in the compensated frame. These problems can be solved but generally the backward mode is more simple.

As previously indicated, the partition leads to a compensated partition RECCOMP(0). In a second sub-step (2), a compensation error ERR(0) is then computed by way of a subtraction between SEG(0) and RECCOMP (0). Finally, a third sub-step (3a, 3b, 3c) is provided for estimating and comparing the coding costs of each region individually, as defined by SEG(0) (intra-frame mode) or by ERR(0) (inter-frame mode). The estimations (3a) in intra-frame mode and inter-frame mode can be done either by actually coding the information and measuring the resulting amount of information or by using any other technique that provides an approximation of the cost (for example, by assuming that the cost is proportional to the length of the contour of the region). Once both estimations have been performed, the comparison and selection (3b) can be done and the resulting decision is stored (3c) as the additional binary information updating the motion information MOT(0).

Figure 6:
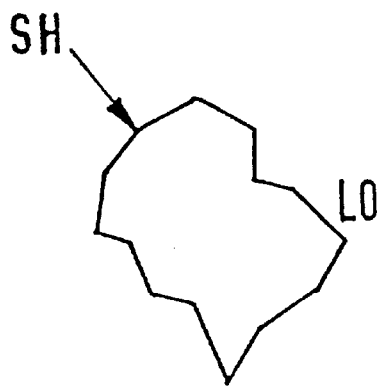
FIGS. 6 and 7 illustrate the shape coding in intra-frame mode and in inter-frame mode respectively.
Figure 7:
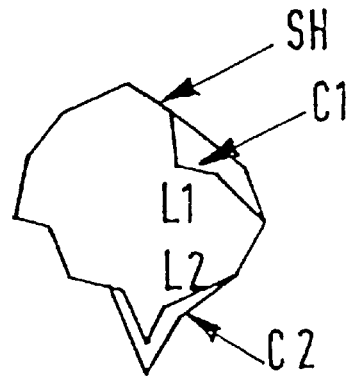

The objective of this sub-step (3a, 3b, 3c) is to assess the coding cost of the shape information if the region is coded in intra-frame mode or in inter-frame mode. The problem is illustrated in FIGS. 6 and 7.

According to the first option (FIG. 6), it is considered that the region is sent in intra-frame mode. In this case, all the contours of the shape SH have to be coded. One can either actually code it by classical contour coding techniques and compute the resulting number of bits or make an estimation saying for example that the resulting cost is proportional to the length L0 of the contour of the concerned region (the cost can be estimated as $C_{intra}=kL0$). The second option (FIG. 7) consists in coding only the compensation error. In the example of FIG. 7, only two small contour segments C1 and C2 have to be coded because the shape compensation corresponds quite well to the real shape. To get the cost, one can actually code the two segments of lengths L1 and L2 by classical techniques as before or make an estimation (for example $C_{inter}=1,7 (L1+L2)$). The multiplicative factor is higher than previously to take into account the increased number of starting points. However, this factor depends on the technique that is going to be really used. Once both costs have been computed or estimated, the decision (selection of the lower cost) is taken by comparing them. If $C_{inter}$ is lower than $C_{intra}$, the region will be sent in inter-frame mode, otherwise it will be sent in intra-frame mode. The resulting decision is stored (3c) as the additional binary information updating the motion information MOT(0).

The first step of definition of the transmission mode is followed by the second step of the order computation, which can be decomposed, as shown in FIG. 1, in a first sub-step (4a, 4b) and a second sub-step (5). This first sub-step is provided for estimating a set of order parameters and the second sub-step for achieving a quantization of the order information for the transmission. The first sub-step (4a, 4b) relies on a double loop, one of them scanning the regions defined by their label and the other one scanning the positions (i,j) of the image space, and involves two operations in cascade.

The first operation (4a) is provided for defining a motion vector for each position (i,j) of the region corresponding to the concerned label. The motion information MOT(0) gives indeed for each region a motion model which is a function of the position (i,j). For instance, if the motion model for a given region is a translation (dx, dy), then this motion vector is assigned to all points (i,j) of the image. If the motion model is an affine model (of parameters $a_1, a_2, a_3, a_4, a_5, a_6$), then the motion field at the point (i,j) is defined by $Vx(i,j)=a_1i+a_2j+a_3$ and $Vy(i,j)=a_4i+a_5j+a_6$. If the region has to be transmitted in intra-frame mode, this motion field expansion is not performed.

The second operation (4b) is provided for updating the order corresponding to the concerned region. The order information consists in a list of possible regions in conflict, i.e. of regions of REC(-1) that may overlap with other regions during the motion compensation. Such an order list is set to zero at the beginning of the process. If one denotes by LABSEG(0) and LABREC(-1) the region labels of the current pixel (i,j) in the current partition SEG(0) and of the pixel (i-Vx(i,j), j-Vy(i,j)) in the previous reconstructed partition REC(-1), the list entry corresponding to the conflict between the region of label REGNUM (REGNUM is a working label associated to each region successively considered in the current partition SEG(0)) and the region having the current label LABSEG(0) is updated if the following conditions are fulfilled:

(a) the current label LABSEG(0) is different of any label of a region transmitted in intra-frame mode: in that situation (i.e. if the point (i,j) in the current partition SEG(0) corresponds to a region which is transmitted in intra-frame mode), any compensated label that falls in such a position is discarded;

(b) the previous label LABREC(-1) is identical to the label REGNUM: the point (i,j) of the current partition SEG(0) is then a candidate to receive this label REGNUM;

(c) the current label LABSEG(0) is not identical to the label REGNUM: the correct label of the pixel (i,j) is then not REGNUM, and the regions with the current label LABSEG(0) and the label REGNUM (=LABREC (-1)) are conflicting regions, the first one being in the foreground of the second one (the list entry corresponding to the conflict between the labels LABSEG(0) and REGNUM is then incremented by one unity).

This procedure is iterated for all points (i,j) and for all labels REGNUM, the order list finally giving the number of occurrences where it has been possible to declare that a given region is in the foreground of another region.

The second step (5) is then provided in cascade with the first one for quantizing the order (the receiver will only need a binary decision in order to be able to solve the situations with conflicting labels during the motion compensation). This quantization is achieved by comparing for each pair of labels the number of occurrences where the first one has been declared to be in the foreground of the second one with the number of occurrences where that second one has been declared to be in the foreground of the first one. The final order between the two concerned regions is defined as the one corresponding to the largest number of occurrences. This order ORD(0) may then be sent backwards for use as an input for the sub-step (1a, 1b), in order to constitute an iterative loop in which said order information allows to update the definition of the contour transmission mode. The number of the iterations is kept low if one wants not to increase the computational load. In practice, only two or three iterations are sufficient. It must be noted, in this case of an iterative loop, that the partition compensation cannot be done if the order information ORD(0) is not known. To solve this problem, it is simply supposed in a first iteration that all new regions (that is to say regions which are present in SEG(0) and not present in REC(−1) are transmitted in intra-frame mode and that all other regions are sent in inter-frame mode, which is equivalent to give to ORD(0) an initial value designated by the reference $ORD_0$ in FIG. 1. Finally, once the order information has been defined, the encoding step of the coding method, designed by the reference (6) in FIG. 1, can be carried out, for instance by following the contour/texture coding approach described in the already cited document "Motion and region overlapping estimation . . . ", IEEE-ICIP, November 1994.

The above-mentioned partition compensation will now be described in a more detailed manner. This sub-step (1a, 1b) is intended to realize the compensation of the previous reconstructed partition REC(−1) and comprises several operations. Since the region a particular point (i,j) of the compensated partition belongs to is not known, all possible motion parameters assuming successively that this point belong to all possible regions (of label REGNUM) have to be tested. The first operation (1a) is therefore provided for defining a motion field for the entire image while using the motion parameters assigned to a single region, the current one of label REGNUM. For the operation (1a), it is temporarily assumed that all pixels of the image belong to the region REGNUM. Generally this operation (1a) can be easily done because the motion information gives for each region a motion model which is a function of the position (i,j). As for the operation (4a), if the motion model for a given region is a translation, this translation vector is assigned to all points (i,j) of the image. If the motion model is an affine one, then the motion field at every point (i,j) is defined by this model. This definition operation, similar to that one previously described (first operation (4a) of the first sub-step of the second step "order computation"), is followed by a second operation (1b) of compensation, according to which, for each pixel (i,j) of the compensated partition RECCOMP(−1), the compensated label is defined as follows (the procedure being iterated for all pixels (i,j) and for all regions, that is to say for all labels REGNUM):

(a) if the pixel (i,j) corresponds to a region which has been transmitted in intra-frame mode, the label is not compensated: any compensated label that falls in that region is discarded;

(b) if the previous label LABREC(−1) (i.e. the region number of the pixel (i−Vx(i,j), j−Vy (i,j)) in the previous partition REC(−1)) is identical to the current label REGNUM, the compensation is valid and the pixel (i, j) is a candidate to receive the label REGNUM;

(c) if the location (i,j) of the compensated partition is empty, the label LABREC(−1) must be assigned to that position;

(d) if the location (i,j) has already been assigned a label, this compensated label is in conflict with the previous label LABREC(−1), but this conflict can be solved by the order information stored in ORD(0): the label is the one corresponding to the foreground region as defined by ORD(0).

This procedure is iterated for all points (i,j) and for all possible regions of label REGNUM. At the end, the compensated information can be post-processed in order to create a partition. Indeed, the previous compensation technique does not guarantee the definition of connected regions and in practice several connected components may have the same label. To solve this problem, a two steps procedure may be used. The first step selects one connected component for each label. Several criteria may be used. A simple one consists of selecting the largest component (note that this selection can be done at the receiver side without the need of transmission of any overhead information). The elimination of some connected components will create some holes in the partition, i.e. some regions which correspond neither to a region sent in intra-frame mode nor to a compensated label. These holes can be left and processed as individual regions by the following step or they can be removed. For example, a hole can be eliminated by a propagation of the neighboring labels or by assigning it to the largest neighboring, etc. At the end of this procedure, one has the final compensated partition RECCOMP(0).

Figure 8:
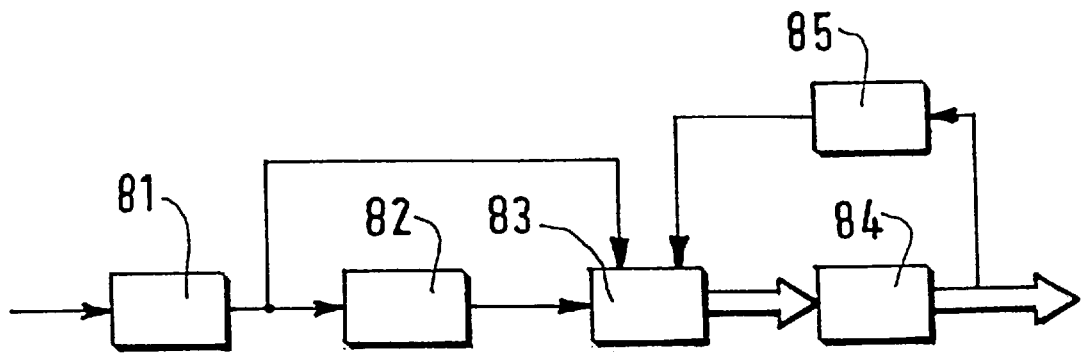
FIG. 8 shows an embodiment of a coding system carrying out said previous method.
Figure 9:
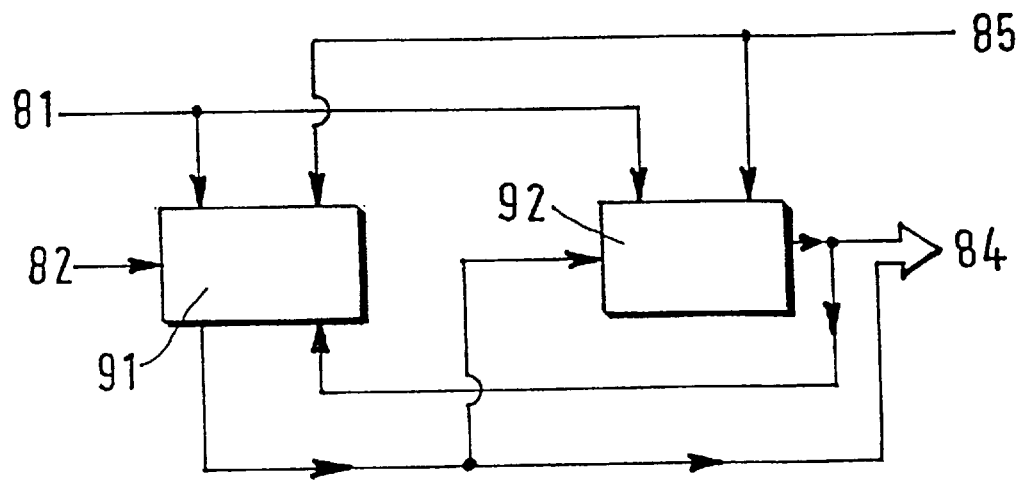
FIGS. 9 to 11 show in a more detailed manner some devices of the coding system of FIG. 8.
Figure 10:
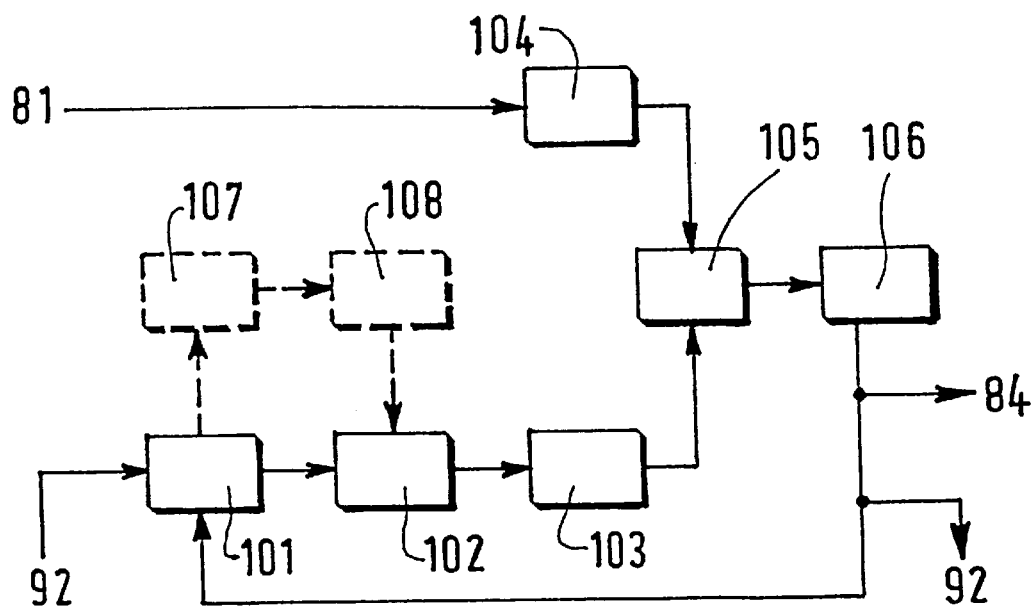
Figure 11:
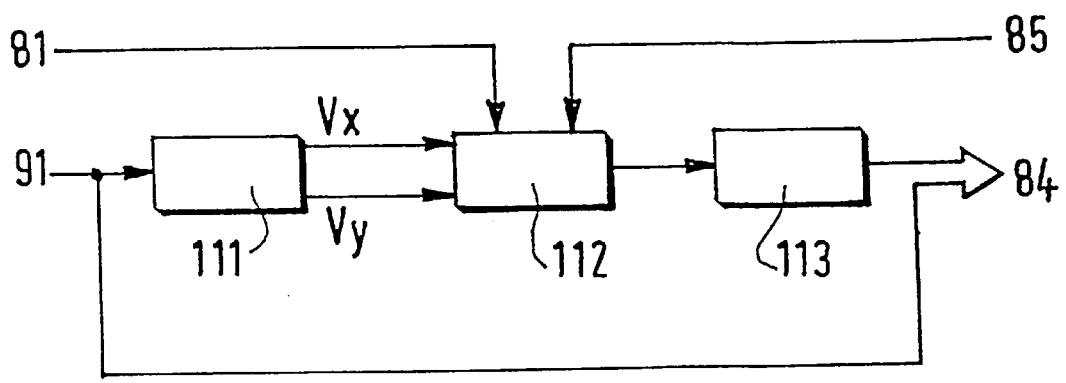

The coding method which has been described above can be implemented in several manners, for instance by means of the coding system of FIG. 8, detailed in FIGS. 9 to 11. The illustrated coding system comprises in cascade a segmentation device 81 generating the successive partitions to be coded, a motion estimation device 82 for the evaluation of the motion of the regions of each current partition with respect to the previous one, an order evaluation device 83 for defining the priority between the regions of the current partition to be coded, a coding device 84 that implements the texture and contour coding step for each region of the current partition, and a partition reconstruction device 85.

The order evaluation device 83 comprises a decision-directed sub-system organised in the form of a loop including a first circuit 91 for the definition of the transmission mode (intra or inter) of each region and a second circuit 92 for the order computation. The first circuit 91 receives the current partition SEG(0) from the device 81, the previous reconstructed partition REC(−1) from the device 85, the motion information MOT(0) from the device 82, and the output order signal of the second circuit 92. The second circuit 92 receives the output updated motion information available at the output of the first circuit 81, the current partition SEG(0), and the previous reconstructed partition REC(−1), and its output is the order signal sent both towards the fourth input of the first circuit 91 and, together with said updated motion information, towards the coding device 84.

The first circuit 91, provided for comparing the coding cost of the contour information in intra-frame and inter-frame modes, comprises a selection sub-assembly (103 to 106) for carrying out an estimation of the coding costs in intra-frame mode (in coding blocks 103 and 104, at the outputs of which the resulting amounts of information are measured) and, after a comparison of both costs, the selection (block 105) of the smaller one and of the corresponding updated motion information (block 106). In the circuit 104, the coding cost is directly computed from the partition SEG(0), while in the circuit 103, it is computed after the previous computation (in a block 102) of a compensation error deduced from an estimation of a compensated partition. Said compensated partition is available at the output of a compensating block 101. However, as this compensation may not guarantee the definition of connected regions (several connected components may have the same label), a selection of only one connected component is done (for instance the greatest one) in a block 107, and the holes corresponding to the eliminated other ones (i.e. regions which correspond neither to a region sent in intra-frame mode nor to a compensated label) are, in a postprocessing block 108, either left and processed as individual regions or removed.

The second circuit 92, provided for generating the order signal, comprises a motion field expansion block 111, an updating block 112 and a quantization block 113. The block 111 assigns for the entire image the motion field (Vx, Vy) deduced from the motion parameters assigned to each concerned region, and the block 112 then carries out the updating of the motion information. The block 113 achieves a quantization of the order information by generating a binary number corresponding, for each pair of examined labels (i.e. of concerned regions), to the label corresponding to the greater number of occurrences of the situation where said label has been declared to be in the foreground of the other one.

Figure 12:
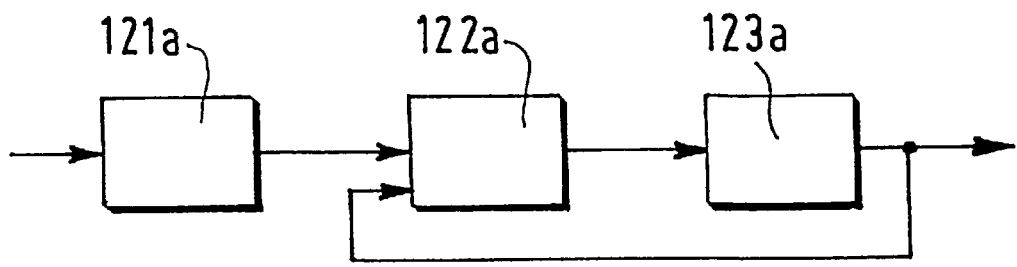
FIG. 12 is an illustration of a method for decoding signals coded as indicated above.

Said previous european patent application also relates to a method for decoding a coded signal such as described above, and to a corresponding decoding sub-system. The decoding method, illustrated in FIG. 12, involves the following steps: an intra decoding step 121a, a motion compensation step 122a, and a partition reconstruction step 123a, the output of which both constitutes the current reconstructed partition and is used for the following decoding cycle.

Figure 13:
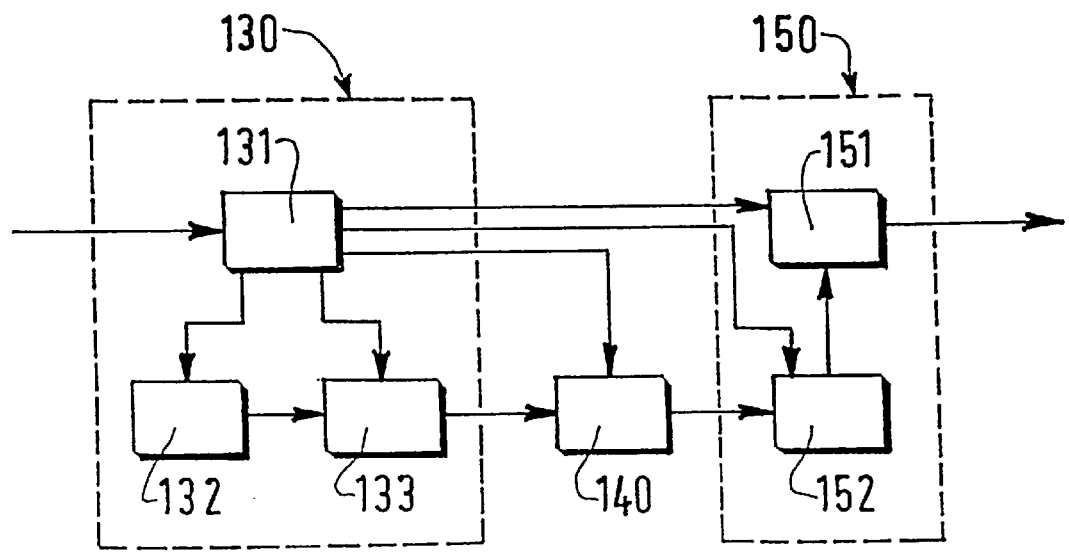
FIG. 13 shows an embodiment of a decoding circuit included in a decoding system carrying out said decoding method.

The first decoding step 121a, carried out, as indicated in FIG. 13, by an intra region decoding circuit 130, is provided for a restitution of the contours of the regions that have been sent in intra-frame mode. The corresponding decoding circuit comprises an input buffer 131 and a decoding stage 132 that allows to reconstruct the regions sent in intra-frame mode, according to the specific technique that has been used for the shape coding at the transmitting side (for example, in the case of a chain code method such as described for instance in the communication "Spiral image compression-by an unrestricted chain coding method", P. N. Nicholl and R. J. Millar, 5th International Conference on Image Processing and its Applications, UK, Jul. 4–6, 1995, pp.564–568, the basic method for such a reconstruction is to read from the input buffer the location of the starting point of the contours and then to read the successive displacements of the chain, such as right-turn, left-turn, straigh ahead, in order to draw the decoded contours). Once the set of contours is drawn, a mask definition stage 133 allows to assign the various labels to each region and a zero label to the other regions (that will be transmitted in inter-frame mode). A mask indicating these regions is therefore created.

The second motion compensation step 122a can be done as previously indicated (the corresponding compensating circuit 140 will therefore not be described in a more detailed manner), the order information being used to solve conflicts appearing when two different labels may be assigned to the same location (the label corresponding to the foreground region as defined by said order information is assumed to be the correct one). The compensated partition is made of intra-frame coded regions, motion compensated regions and holes corresponding to empty areas (where no labels have been assigned during the compensation process).

Once this compensated partition is available, the third partition reconstruction step 123a, carried out by a decoding circuit 150, allows to decode in an error region decoding stage 151 the small contour segments that form the error regions. A similar process as the one used for the decoding stage 132 can be used, the main difference being now that one deals no longer with the whole contour of a region but only with pieces of contour. At the output of the decoding stage 151, a so-called over-partition, made of the intersection between the compensated regions and the set of transmitted error regions, is available. A label decoding stage 152 then allows to decode the labels of the regions of this over-partition, and these labels are assigned.

Figure 14:
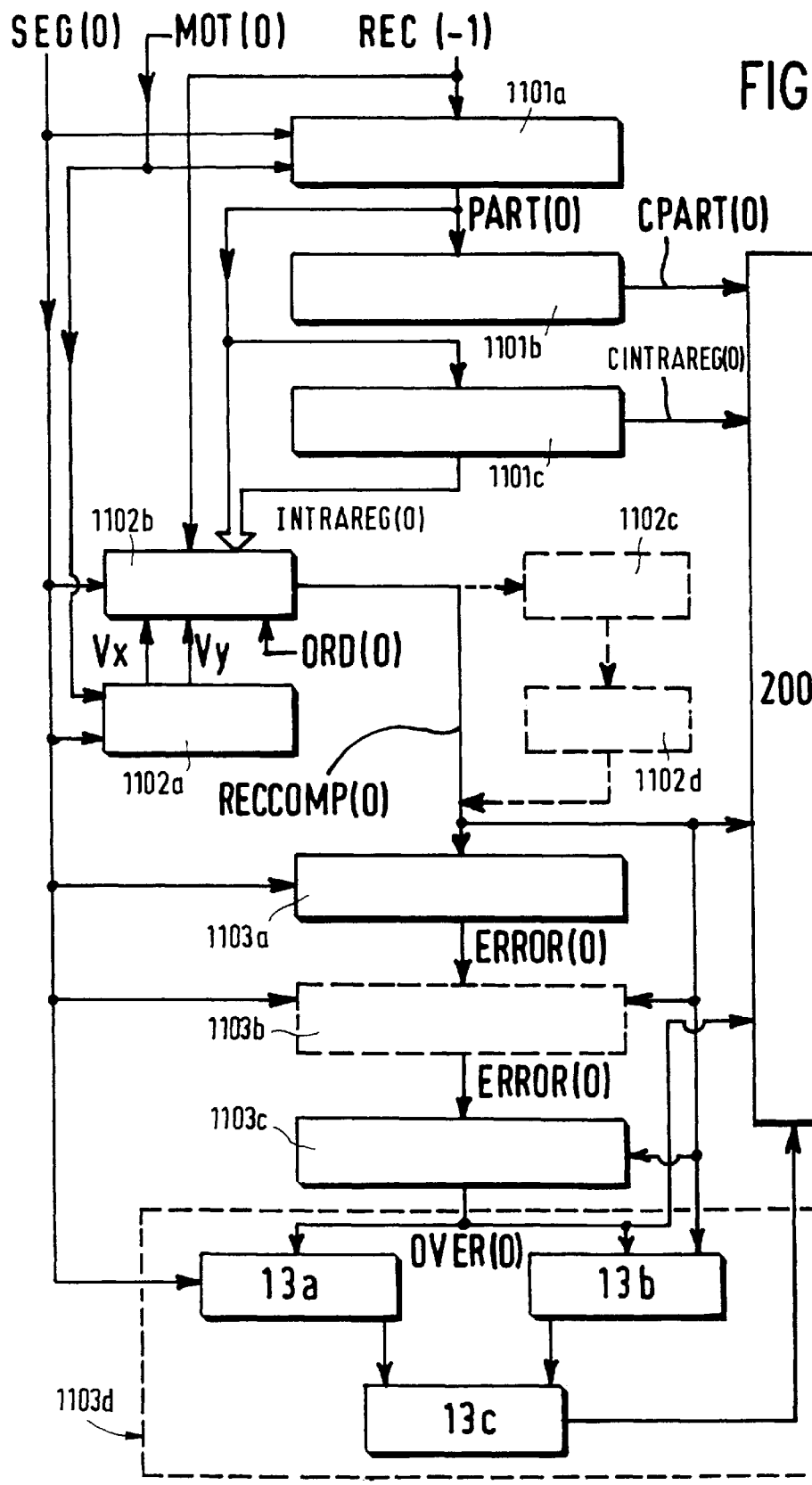
FIG. 14 is an illustration of a coding method according to the invention.

Once the order has been estimated, for instance by said previously recalled method being the object of the cited european patent application, the coding of the partition can be done by implementing the encoding method illustrated in FIG. 14. According to the invention, such a method comprises in cascade the following steps:

(A) a first step for selecting and coding the contours of the regions that have to be transmitted according to the intra-frame mode;

(B) a second step for generating a compensated partition involving both said regions to be sent in intra-frame mode and compensated regions;

(C) a third step for computing from said current and compensated partitions partition errors and coding them.

The first step (A), provided for defining the contour information of the regions to be sent in intra-frame mode and a corresponding binary mask indicating where the partition is therefore considered as being already defined, comprises three sub-steps 1101a, 1101b, 1101c.

The first sub-step 1101a consists in selecting the set of regions which have to be transmitted (and/or stored) in intra-frame mode. This set of regions is composed of two kinds of regions: the new regions, that are present in the current partition SEG(0) and not present in the partition REC(–1) reconstructed after the previous partition SEG(–1) has been coded, and the regions for which it is already known that they have to be sent in intra-frame mode (this last kind of regions includes for example the regions which were defined, during the implementation of the coding method described in the cited european patent application, as to be sent in such intra-frame mode for contour coding). As previously seen, the information about the transmission mode has been included inside the global information MOT (0) that characterizes the evolution of the partition between the previous partition SEG(–1) and the current partition SEG(0). This region selecting sub-step 1101a therefore defines a partition PART(0) of the space corresponding to each image of the video sequence.

As the partition PART(0) has to be sent to the receiver side, the second sub-step 1101b is provided to carry out the corresponding coding operation, according to one of the numerous known techniques and for instance according to the coding method described in the communication "Shape and location coding for contour images", Picture Coding Symposium, Lausanne (Switzerland), March 1993, pp.18.6.1–18.6.2 (according to such a conventional method, a set of symbols is created, stored, entropy coded, multiplexed, and sent to the transmission channel, the information such transmitted allowing at the receiver side the restoration of the contours of the partition). The delivered coded information, called CPART(0), is stored (sub-step 200).

Figure 15:
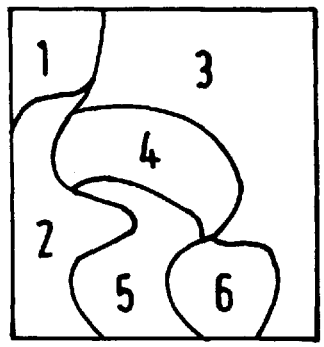
FIG. 15 concerns the first step (A) of the coding method shown in FIG. 2 and illustrates an example of contour information corresponding to a partition of six regions only four of which will be sent in intra-frame mode.
Figure 16:
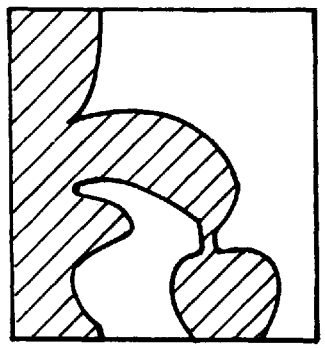
FIG. 16 shows a mask indicating these locations where the label will be sent in intra-frame mode, this mask being useful for carrying out the second step (B)

As this second sub-step 1101b does not indicate which regions will be transmitted in intra-frame mode, this operation is implemented during the following sub-step 1101c. If it is for example supposed, in reference to FIG. 15, that the transmission of the contour information creates a partition of six regions and that from these regions only four (1,2,4,6) will be sent in intra-frame mode, a mask shown in FIG. 16 and indicating these locations is created. This mask, called INTRAREG(0) and allowing to indicate, thanks to different codes for each region depending on its transmission mode, the locations where the label has to be sent in intra-frame mode will be useful during the second step (B) (each time a label will be compensated at a location falling inside the mask and therefore corresponding to a region transmitted in intra-frame mode, this compensated label will not be taken into account). A coded information CINTRAREG(0) corresponding to the mask and the coded information CPART(0) are then stored (sub-step 200) in view of the subsequent transmission. The signals PART(0) and INTRAREG(0) respectively available after having carried out said first and third sub-step (1101a, 1101c) constitute together a first version of the compensated partition that has to be computed.

The second step (B) is provided for computing a compensated partition RECCOMP(0) from the previous reconstructed partition REC(−1) and comprises two sub-steps 1102a and 1102b, according to a procedure similar to the one used previously in the cited european patent application (the first operation 4a of the first sub-step of the second step of the order computation).

The first sub-step 1102a is provided for defining a motion field for the entire image on the basis of the motion parameters assigned to a single region, the current one of label REGNUM, that is to say for defining a motion vector for each position (i,j) of the image when the motion parameters of a single region defined by its label are specifically used for the entire image. As previously, the motion information MOT(0) gives for each region a motion model which is a function of the position (i,j), and said motion vector, having horizontal and vertical components Vx(i,j) and Vy(i,j), can be defined by using said local motion model.

The second sub-step 1102b is provided for the implementation of the compensation of each region of the partition REC(−1), on the basis of a supposed motion given by the obtained vector (Vx(i,j), Vy(i,j)) for each current pixel (i,j). If one denotes by:

(a) COMPMASK, the value of the mask INTRAREG(0) defined during the third sub-step 1101c of the first step (A) (COMPMASK defines a kind of map of the regions sent in intra-frame mode);

(b) PREVLAB, the region number of the pixel (i−Vx(i,j), j−Vy(i,j)) in the previous partition REC(−1);

then the compensated label COMPLAB is defined as follows for each pixel (i,j) of the compensated partition RECCOMP (0), this label definition procedure being iterated for all points (i,j) and for all regions of label REGNUM:

(1) for any region transmitted in intra-frame mode, the label is not compensated (more generally, if a point (i,j) corresponds to a region which has been transmitted in intra-frame mode, any compensated label that falls inside this regions is discarded);

(2) if the previous label PREVLAB is equal to REGNUM, the point (i,j) of the compensated partition is a candidate to receive this label REGNUM;

(3) if a location (i,j) of the compensated partition is empty, the previous label PREVLAB is assigned to that position;

(4) if a compensated label has already be assigned to a location (i,j) of the compensated partition, this compensated label COMPLAB and the previous label PREVLAB are in conflict, but this conflict can be solved thanks to the additional information mentioned above, and for instance thanks to the order information ORD (0) defined in the cited patent application.

At the end of this procedure, a final compensated partition involving both INTRAREG(0) and the regions that are motion compensated and stored in RECCOMP(0) (sub-step 200) is available.

The third step (C), provided for coding the partition errors according to the inter-frame mode, comprises four sub-steps 1103a to 1103d. The second of these sub-steps (1103b) can be omitted.

Figure 17:
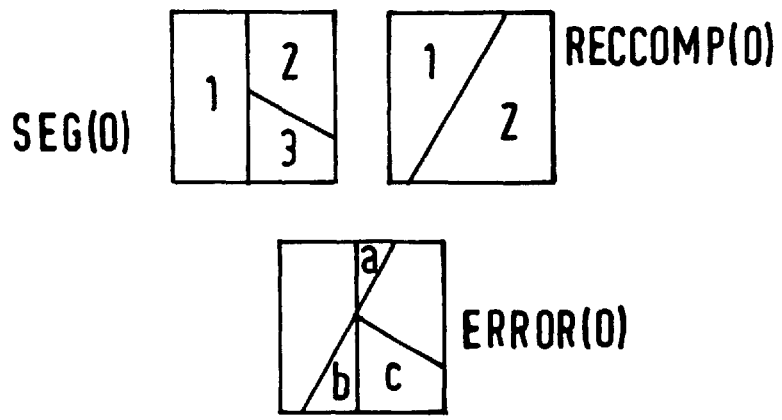
FIG. 17 concerns the third step (C) and illustrates an example of current and compensated partitions respectively made of three and two regions, and of the corresponding error mask including three error regions with respective labels a,b,c.

The first sub-step 1103a, provided for computing an error partition ERROR(0) from the current partition SEG(0) and the compensated partition RECCOMP(0), consists in extracting the locations of the space where the compensated label of RECCOMP(0) is different of the current label defined by SEG(0). The locations corresponding to regions sent in intra-frame mode are obviously excluded of the extracting operation. As shown, FIG. 17 illustrates a very simple example where the partition SEG(0) issued from the segmentation is made of three regions (1, 2, 3) and the compensated partition RECCOMP(0) previously computed only involves two regions (1,2). The areas of error (where labels are therefore different), designated by a, b, c in FIG. 17, are simply created by computing for each pixel the difference of labels between the partitions, according to the following table:

| Label of SEG(0) | Label of RECCOMP(0) | ERROR (0) |
| --- | --- | --- |
| 1 | 1 | No error |
| 1 | 2 | Error, region b |
| 2 | 1 | Error, region a |
| 2 | 2 | No error |
| 3 | 2 | Error, region c |

In each resulting error region a,b,c of the error partition ERROR(0) thus obtained the labels of SEG(0) and RECCOMP(0) are constant: that means that in each error region, the same type of error has occurred (for example, in region a the compensated label is 1 and should be 2) and allows for instance (if necessary, or wanted) to remove some of the error regions by saying "all errors of type a have to be forgotten". This extracting sub-step 1103a results in a so-called error mask.

A second sub-step 1103b can then be provided. Although it is not compulsory, this sub-step is useful for examining each region of the error partition in order to know whether it has to be preserved and coded, or on the contrary discarded, according to a predetermined criterion. In practice, the most useful criterion is either a geometrical one, according to which all error regions that are for instance smaller than a given size may be removed (the size of a region can be considered as its area, or its maximum elongation, or its maximum width, and so on . . . ), or a gray level one, according to which all error regions that do not introduce a strong modification of the gray level value (or also of the color value) may be discarded. In this latter case, the decision can be taken for example by considering the values assigned to the error region if it is assumed to belong to the region defined by RECCOMP(0), on the one hand side, and by SEG(0), on the other hand side, said error region being discarded if the difference between these values is small (smaller than a given threshold for instance). As already seen, two different names should be used for the error partitions, the original one being then called ERRORI (0) in place of the first ERROR(0) and the second one being called SIMERROR(0) in place of the second ERROR(0) which is the simplified error.

The third sub-step 1103c is provided for coding the contours of the error regions while deriving benefit from the fact that some contours are already known, and the fourth and final sub-step 1103d is provided for coding the label of each region of said over-partition OVER(0). As shown in FIG. 14, this sub-step 1103d comprises a first operation 13a during which the compensated labels, which were defined during the compensation process of the second sub-step 1102b, are extracted, and a second operation 13b during which the most probable labels of the current partition SEG(0) are estimated. Since the error coding process is generally a lossy one, each region of the over-partition OVER(0) generally involves several labels of the current partition SEG(0). It is however necessary to take a decision concerning the label of each region of OVER(0), which is for instance done by first establishing a list of the labels of SEG(0) encountered by scanning the concerned region of OVER(0), determining either the area or the number of pixels corresponding to each label of SEG(0), and selecting the label that corresponds to the greatest one. This label, called DOMLAB(0) or most probable label, is defined as the dominant label of SEG(0) that falls within the error region.

The dominant labels can be sent directly in the transmission channel, but this will generally result in an excessive amount of information. In order to reduce it, one can provide a third operation 13c using the following coding strategy:

(1) for a given region, an ordered list of the compensated labels of the neighboring regions is created, for example according to the numerical values of the labels or to the geometrical position of the neighboring regions;

(2) to define each label, the following code is assigned, the cases (a) and (b) being the most frequently encountered:
 (a) if DOMLAB(0)=COMPLAB(0), the label receives the code 0;
 (b) if DOMLAB(0)=one of the labels of said ordered list of compensated labels, the label receives a code that indicates the position of the label in said ordered list;
 (c) in all other cases, an escape code, followed by the actual label DOMLAB(0), is delivered.

Figure 18:
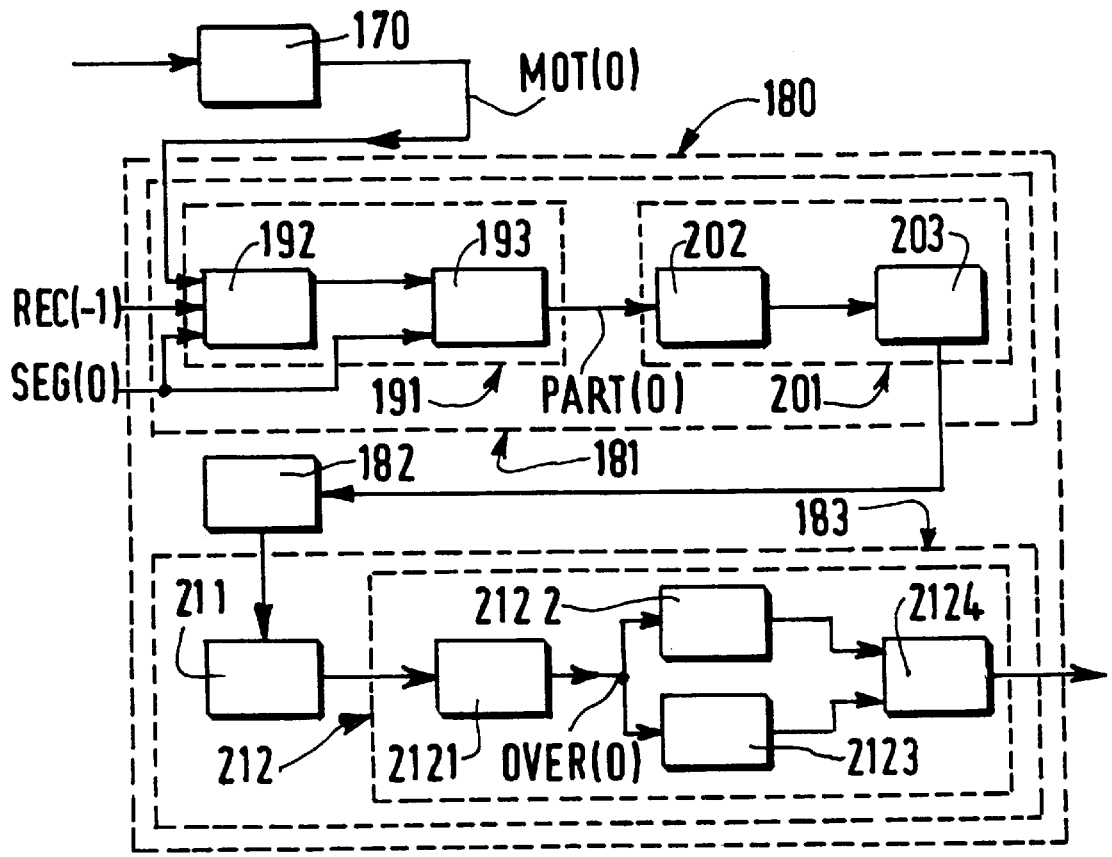
FIG. 18 is an example of a coding system for implementing the coding method of FIG. 14.

The invention is not limited to the embodiment described above, from which modifications or improvements can be deduced without departing from the scope of the invention. For instance it is clear that this coding method can be implemented in several manners, such as with the aid of wired electronic modules or, preferably, in the form of an embodiment including a processor or a microprocessor that ensures the performance of series of instructions corresponding at least to a part of the functions, computations and other operations carried out within said electronic modules. An example of such a coding system is shown in FIG. 18. This system comprises in cascade means 170 for estimating a motion model that characterizes for each of said regions the evolution of the segmentation from the previous partition SEG(−1) to the current one SEG(0), followed by means 180 for encoding the contour and the texture of each region of said current partition. More precisely, these encoding means 180 comprise an intra coding device 181, for generating the coded contour information of the regions to be transmitted and/or stored in an intra frame mode, a compensating device 182, for computing a compensated partition that includes said regions sent in intra-frame mode and regions compensated according to said estimated motion model, and an inter coding device 183, for extracting and coding partition errors, such partition errors being defined by an extraction of error regions where compensated and current labels are different.

The intra coding device 181 itself comprises a first selection stage 191, including a first block 192, provided for defining a list of the regions said intra that have to be transmitted and/or stored in intra-frame mode, and a second block 193, provided for generating a mask associating said regions. The device 181 also comprises a first coding stage 201, including a first contour coding block 202, provided for coding the contour of said intra regions, and a second label coding block 203, provided for coding the mask information. The inter coding device 183 comprises a second selection stage 211, provided for defining an error mask associating said error region, and a second coding stage 212, provided for coding the contour of the error regions and the labels of each region of an over-partition associating the contours of said compensated partition and the contours of said error regions.

In the stage 191 of the device 181 that carries out the sub-steps 1101a to 1101c and is provided for creating the partition PART(0) involving all regions that have to be sent in intra-frame mode, the first block 192 analyses the motion information MOT(0), the reconstructed partition REC(−1) and the current partition SEG(0) and creates said list of these regions, according to the following procedure conducted for each region of SEG(0). If the region is not present in REC(−1), i.e. if the corresponding label does not appear in REC(−1), this region has to be sent in intra-frame mode. Else the motion information MOT(0) is checked: in the motion parameters, including the parameters of translation, zoom and rotation, one bit is provided for indicating if this region has to be sent in intra-frame or in inter-frame mode. The second block 193 generates a mask involving only the regions of SEG(0) that are present in the created list. The areas with no regions are left empty and, for example, a zero label is assigned to their pixels.

The contour coding block 202 may use any known contour coding technique, and for instance polygonal approximations and representations of contours such as described in the european patent applications EP-0587232 and EP-0592029 previously filed by the applicant. The label coding block 203 sends a particular code for each kind of region, the simplest solution being for instance a label "one" for an intra region.

The compensating device 182 allows to carry out the second step (B) of the encoding method illustrated in FIG. 14, for the definition of the compensated labels, the obtained partition RECCOMP(0) involving as already indicated both INTRAREG(0) (the regions sent in intra-frame mode) and the regions that are motion compensated.

Figure 19:
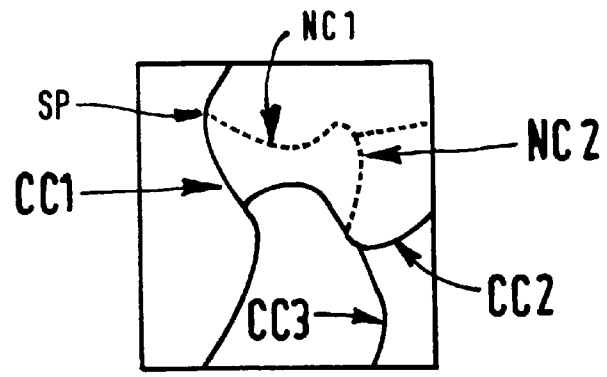
FIG. 19 illustrates a contour coding sub-step (of the error regions), in the case of the coding method of FIG. 14.

The inter coding device 183, the purpose of which is to carry out the sub-steps 1103a to 1103d, comprises the second selection stage 211, followed by the coding stage 212 that is composed of a contour coding device 2121 and a label coding device comprising an extracting circuit 2122, a computing circuit 2123 and a code assigning circuit 2124 for carrying out the operations 13a, 13b, 13c. As shown in FIG. 19 that illustrates the contour coding of the error regions carried out by the device 2121, the contours CC1, CC2, CC3 (in this example) that correspond to the compensated partition RECCOMP(0) previously computed are indeed already known and only the new (not known) contours NC1, NC2 (in dotted lines in FIG. 19) have to be coded (and transmitted). A technique similar to the one used for the intra-frame mode (see the sub-step 1101b) is also used here, with the only difference that one has to take into account the presence of the already known contours (it is for instance possible to code more efficiently the starting or end points of the new contours when they are located on these already known contours). In fact, for each piece of contour, it is necessary to send its position and its shape. The position can be sent by defining the location of its starting point (SP, in FIG. 19), for example by direct coding of the coordinates of that point (this starting point being always located on a compensated contour CC1, CC2, CC3, the position can be defined on this compensated contour itself). The shape can be sent by any shape coding technique, such as the chain coding method described in the communication "Spiral image compression . . . " already cited in relation with the description concerning the decoding circuit 130 of FIG. 13. In practice, a very large number of coding techniques can be used for implementing this coding sub-step, and for example those described in the european patents EP-0587232 and EP-0592029 already cited. The partition resulting from this third sub-step 1103C can be seen as an "over" partition involving contours of both the partition SEG(0) and the compensated partition RECCOMP(0) and is called for instance OVER(0).

It must be underlined that the invention also relates to a coded signal as defined at the output of such a coding system (whatever its embodiment), and consequently to any storage medium on which that signal is stored (if it is not immediately transmitted or, when it is transmitted, if it is not immediately used at the reception side). This coded signal, corresponding, in the present case of a sequence of segmented images that comprise a plurality of regions and associated labels and define successive partitions, to each region of the current partition of said sequence, consists of a multiplexed signal comprising several kinds of information: a motion information, corresponding to the evolution of the segmentation between said successive partitions, a first coded contour information, corresponding to each region of the current partition that has to be transmitted and/or stored in an intra-frame mode, a second coded contour information, corresponding to each region of a current error partition, said partition associating error regions where current labels are different from the labels observed in a compensated partition associating regions compensated according to said motion model, and a coded label information, comprising a label for each region transmitted and/or stored in intra-frame mode and a label for each error region.

If such a complex coded signal is generated, it is however not necessarily transmitted immediately, but only stored in order to be transmitted later, or it may be transmitted but not used immediately at the reception side. In both cases, this coded signal will be stored, and the invention relates to the storage medium on which this signal according to the invention is stored.

Figure 21:
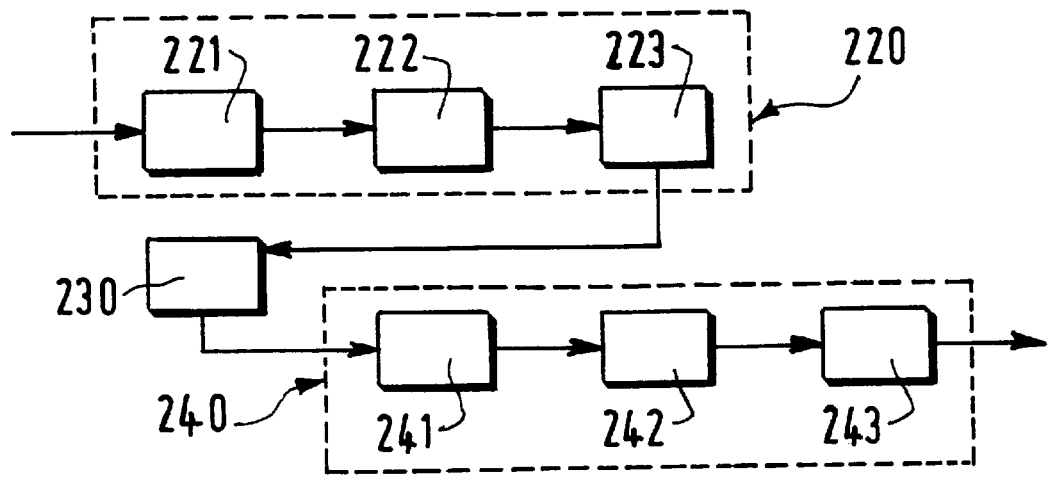
FIG. 21 shows an example of a decoding system for carrying out the decoding method illustrated in FIG. 14.
Figure 20:
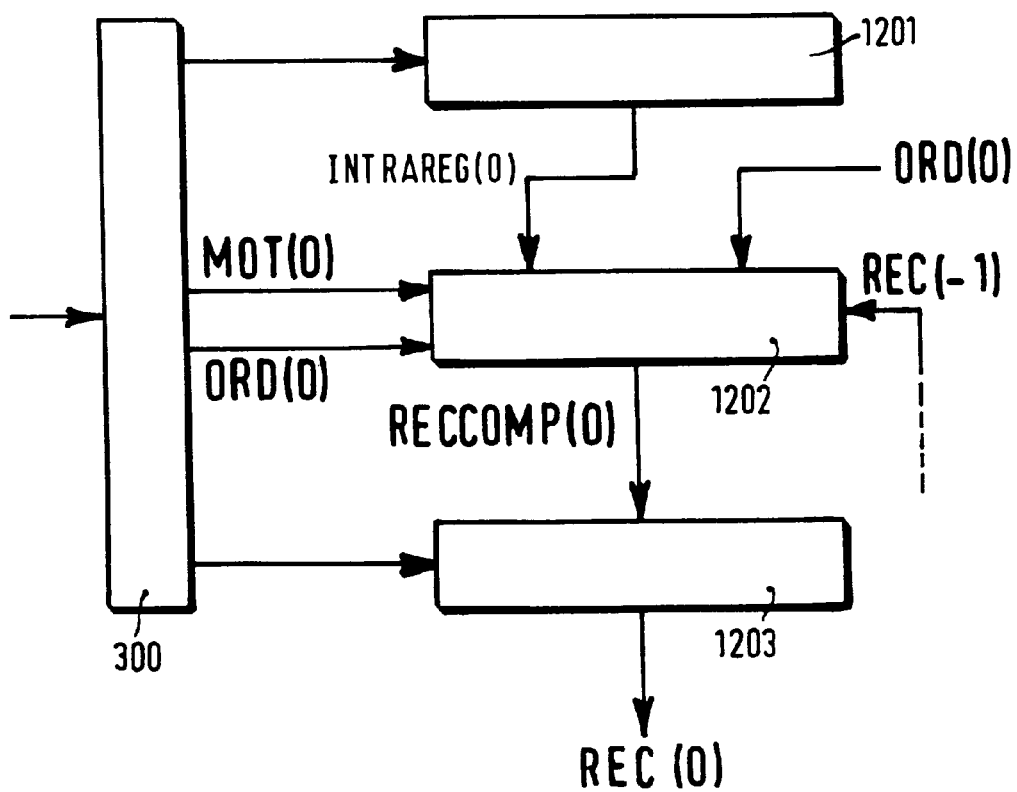
FIG. 20 is an illustration of a decoding method efficient for decoding the coded signals generated according to the coding method of FIG. 14.

Moreover, the invention is obviously not limited to the previous embodiments and further relates to a method for decoding a coded signal such as described above, and to a corresponding decoding system. Such a decoding method, illustrated in FIG. 20, closely follows the inverse steps of the encoding method. After a reading step of the coded information in an input buffer (step 300), the contours of the regions sent in intra-frame mode are restored and a corresponding binary mask indicating these regions is created (step 1201) in view of the compensation. As shown in FIG. 21, that shows an example of a corresponding decoding system, this decoding step 1201 is carried out by an intra region decoding circuit 220 comprising in cascade a buffer memory 221, a contour decoding cirucit 222 and a circuit 223 for filling the regions with either 1 or 0 in order to indicate if they are intra or inter regions. Then the previous partition REC(−1) is compensated using the motion information MOT(0) and the order information ORD(0). This compensating step 1202, here carried out by a compensating circuit 230, is exactly the same, i.e. with the same sub-steps 1102 (see FIG. 14), as the one used in the encoding part. The new contours are then decoded, the over-partition OVER(0) is created, the labels of the corresponding regions are decoded, and the current reconstructed partition REC(0) is generated (step 1203). As also shown in FIG. 21, this decoding step 1203 is carried out by a region decoding circuit 240. The circuit 240 itself comprises an error region decoding stage, provided for generating the over-partition made of the intersection between the compensated regions and the set of transmitted error regions and including a sub-stage 241 for decoding the starting points of the error contours and a sub-stage 242 for decoding the shapes of these contours (for instance according to the principles of the already cited chain coding method), and a circuit 243 for decoding each label and filling each region with its label.

Some of the previously described operations may be improved. It can be noticed for instance that, in the implementation of the coding method illustrated in FIG. 14, the previous second step (B) does not guarantee to define connected regions. In practice several connected components may have the same label, while in some applications it is desirable to have only one connected component per label. Two additional sub-steps 1102c and 1102d, shown in interrupted lines in FIG. 14, are then included in that second step, in series with the first and second sub-steps 1102a and 1102b, and the straightforward connection between the output of the sub-step 1102b and the input of the sub-step 1103a is then cancelled.

The (third) sub-step 1102c is provided for selecting only one connected component for each label, according to a given criterion (one of the simplest criteria is a geometrical one, consisting in selecting the largest component). The elimination of some connected components creates in the partition some holes that can be processed during the (fourth) sub-step 102d, provided for eliminating these holes according to a given criterion. Here also geometrical criteria are attractive: for example, a hole can be eliminated by a propagation of the neighboring labels, or by assigning it to the largest neighboring region. At the end of these two additional sub-steps, one gets the final improved compensated partition, stored as previously in RECCOMP(0) (sub-step 200).

I claim:

1. A method of coding a sequence of segmented images comprising a plurality of regions and associated labels and defining successive partitions, said method comprising the operations of estimating a motion model that characterizes for each of said regions the evolution of the segmentation from a previous partition to a current partition and encoding the contour and the texture of each region of said current partition, in which said encoding operation comprises in cascade the steps of:

coding the contours of the regions to be at least one of transmitted and stored according to an intra-frame mode;

generating a compensated partition involving both said regions to be sent in intra-frame mode and regions compensated on the basis of said motion model;

computing from said current and compensated partitions an error partition and coding both said error partition and the label of each region of the coded error partition in an inter-frame mode; and selecting a coding technique for each region in accordance with at least one predetermined criterion, said coding technique being one of said intra-frame mode and said inter-frame mode, said at least one predetermined criterion including an estimate of computational costs associated with coding each region in said intra-frame mode and said inter-frame mode.

2. A coding method according to claim 1, in which:

(A) said coding step comprises the sub-steps of:
  selecting the set of regions of said current partition that have to be at least one of transmitted and stored in intra-frame mode;
  coding said selected regions;
  creating a mask associating these selected regions and coding it;

(B) said generating step comprises the sub-steps of:
  for each concerned region, assigning to all points of the current partition the motion model estimated for said concerned region;
  generating said compensated partition on the basis of a comparison, for each concerned region, between the current partition and a partition reconstructed while considering said assigned motion model;

(C) said computing and coding step comprises the sub-steps of:
  computing an error partition from said current and compensated partitions;
  coding the contours of a so-called over-partition associating the contours of said compensated partition and the contours of said error regions;
  coding the labels of each region of said coded over-partition.

3. A coding method according to claim 2, in which said generating step comprises, in cascade between its two first sub-steps and the input of said computing and coding step, the sub-steps of:
  selecting one connected component for each label, according to a first predetermined criterion;
  eliminating the holes corresponding to the connected components not selected, according to a second predetermined criterion.

4. A coding method according to claim 2, in which an additional simplifying sub-step is provided between said computing and contour coding sub-steps of the computing and coding step, in order to one of 1) discard and 2) preserve and code each region of the error partition.

5. A system for coding a sequence of segmented images comprising a plurality of regions and associated labels and defining successive partitions, said system comprising means for estimating a motion model that characterizes for each of said regions the evolution of the segmentation from a previous partition to a current partition and means for encoding the contour and the texture of each region of said current partition, in which said encoding means comprises:
  an intra coding device, for generating the coded contour information of the regions to be at least one of transmitted and stored according to an intra-frame mode;
  a compensating device, for computing a compensated partition that includes said regions sent in intra-frame mode and regions compensated on the basis of said estimated motion model;
  an inter coding device, for extracting and coding partition errors in an inter-frame mode, said partition errors being defined by an extraction of error regions in which compensated labels and current labels are different; and
  means, within said intra and inter coding devices, for selecting a coding technique for each region from one of the intra-frame mode and the inter-frame mode in accordance with at least one predetermined criterion, said at least one predetermined criterion including an estimate of computational costs associated with coding each region in said intra-frame mode and said inter-frame mode.

6. A coding system according to claim 5, in which:

(A) said intra encoding device comprises:
  (1) a first selection stage, including a first block, providing for defining a list of intra regions that have to be at least one of transmitted and stored in intra-frame mode, and a second block, provided for generating a mask associating said intra regions;
  (2) a first coding stage, including a first contour coding block, provided for coding the contour of said intra regions, and a second label coding block, provided for coding the mask information;

(B) said inter coding devices comprises:
  (1) a second selection stage, provided for defining an error mask associating said error regions;
  (2) a second coding stage, provided for coding the contour of the error regions and the labels of each region of an over-partition associating the contours of said compensated partition and the contours of said error regions.

7. A coded signal corresponding, with respect to a sequence of segmented images comprising a plurality of regions and associated labels and defining successive partitions, to each region of a current partition of said sequence, said coded signal consisting of a multiplexed signal comprising:

(A) a motion information, corresponding to the estimation of a motion model that characterizes the evolution of the segmentation between said successive partitions;

(B) a first coded contour information, corresponding to each region of the current partition that has to be at least one of transmitted and stored in an intra-frame mode;

(C) a second coded contour information, corresponding to each region of a current error partition to be at least one of transmitted and stored in an inter-frame mode, said partition associating error regions where current labels are different from the labels observed in a compensated partition associating regions compensated on the basis of said estimated motion model; and (D) a coded label information, corresponding to a transmission mode for each region and comprising a label for each region of the current partition at least one of transmitted and stored in the intra-frame mode and a label for each error region at least one of transmitted and stored in the inter-frame mode, wherein the transmission mode for each region is selected in accordance with computational costs of coding the region in the intra-frame mode and in the inter-frame mode.

8. A storage medium for storing a coded signal corresponding, with respect to a sequence of segmented images comprising a plurality of regions and associated labels and defining successive partitions, to each region of a current partition of said sequence, said coded signal consisting of a multiplexed signal comprising:

(A) a motion information, corresponding to the estimation of a motion model that characterizes the evolution of the segmentation between said successive partitions;

(B) a first coded contour information, corresponding to each region of the current partition that has to be at least one of transmitted and stored in an intra-frame mode;

(C) a second coded contour information, corresponding to each region of a current error partition to be at least one of transmitted and stored in an inter-frame mode, said partition associating error regions where current labels are different from the labels observed in a compensated partition associating regions compensated on the basis of said estimated motion model; and (D) a coded label information, corresponding to a transmission mode for each region and comprising a label for each region of the current partition at least one of transmitted and stored in the intra-frame mode and a label for each error region at least one of transmitted and stored in the inter-frame mode, wherein the transmission mode for each region is selected in accordance with at least one predetermined criterion, the at least one predetermined criterion including an estimate of computational costs associated with coding each region in said intra-frame mode and said inter-frame mode.

9. A method for decoding signals corresponding to the regions of each successive partition of a sequence of segmented images, each of said coded signals consisting of a multiplexed signal comprising:

(A) a motion information, corresponding to the estimation of a motion model that characterizes the evolution of the segmentation between said successive partitions;

(B) a first coded contour information, corresponding to each region of the current partition that has to be at least one of transmitted and stored in an intra-frame mode;

(C) a second coded contour information, corresponding to each region of a current error partition to be at least one of transmitted and stored in an inter-frame mode, said partition associating error regions where current labels are different from the labels observed in a compensated partition associating regions compensated on the basis of said estimated motion model; and (D) a coded label information, corresponding to a transmission mode for each region and comprising a label for each region of the current partition at least one of transmitted and stored in the intra-frame mode and a label for each error region at least one of transmitted and stored in the inter-frame mode, the transmission mode for each region being selected in accordance with at least one predetermined criterion, the at least one predetermined criterion including an estimate of computational costs associated with coding each region in said intra-frame mode and said inter-frame mode;

said decoding method comprising the steps of:

(a) decoding the contours of the regions that have been previously coded in the intra-frame mode and creating a corresponding mask by assigning the corresponding labels to these regions and a zero label to the other ones;

(b) generating a compensated partition made of the intra-frame coded regions, motion compensated regions and holes corresponding to empty areas, decoding the error regions coded in the inter-frame mode and generating a so-called over-partition associating the contours of said compensated regions and the contours of said error regions; and (c) decoding and assigning the labels of the regions of said over-partition.

10. A system for decoding signals corresponding to the regions of each successive partition of a sequence of segmented images, each of said coded signals consisting of a multiplexed signal comprising:

(A) a motion information, corresponding to the estimation of a motion model that characterizes the evolution of the segmentation between said successive partitions;

(B) a first coded contour information, corresponding to each region of the current partition that has to be at least one of transmitted and stored in an intra-frame mode;

(C) a second coded contour information, corresponding to each region of a current error partition to be at least one of transmitted and stored in an inter-frame mode, said partition associating error regions where current labels are different from the labels observed in a compensated partition associating regions compensated on the basis of said estimated motion model;

(D) a coded label information, corresponding to a transmission mode for each region and comprising a label for each region of the current partition at least one of transmitted and stored in the intra-frame mode and a label for each error region at least one of transmitted and stored in the inter-frame mode, the transmission mode for each region being selected in accordance with at least one predetermined criterion, the at least one predetermined criterion including an estimate of computational costs associated with coding each region in said intra-frame mode and said inter-frame mode;

said decoding system comprising in cascade an intra region decoding circuit, provided for decoding the regions that have been sent in the intra-frame mode, a compensating circuit, provided for generating a compensated partition made of the intra-frame coded regions, motion compensated regions and holes corresponding to empty areas, and a region decoding circuit including an error region decoding stage, provided for decoding the error regions coded in the inter-frame mode and for generating a so-called over-partition associating the contours of said compensated regions and the contours of said error regions, and a label decoding sub-stage, provided for decoding and assigning the labels of the regions of said over-partition.

* * * * *